United States Patent [19]

Masui

[11] Patent Number: 5,600,809
[45] Date of Patent: Feb. 4, 1997

[54] APPARATUS FOR SEQUENTIALLY READING MICROCODE WORDS WIDER THAN AN EXTERNAL BUS WIDTH TO THE OUTSIDE IN SEGMENTS AS WIDE AS THE EXTERNAL BUS

[75] Inventor: Norio Masui, Itami, Japan

[73] Assignee: Mitsubishi Denki Kabushiki Kaisha, Tokyo, Japan

[21] Appl. No.: 267,341

[22] Filed: Jun. 29, 1994

[30] Foreign Application Priority Data

Jun. 30, 1993 [JP] Japan .................................. 5-160944

[51] Int. Cl.$^6$ ......................................................... G06F 9/30
[52] U.S. Cl. ......................................................... 395/378
[58] Field of Search ................................. 371/21.1, 22.1; 395/500, 775, 375

[56] References Cited

FOREIGN PATENT DOCUMENTS 58-32423  7/1983  Japan .

Primary Examiner—William M. Treat
Assistant Examiner—Gautam R. Patel
Attorney, Agent, or Firm—Lowe, Price, LeBlanc & Becker

[57] ABSTRACT

A semiconductor apparatus for data processing capable of reading a control code to the outside by adding only a small quantity of logical circuit and wiring area, by being provided with an incrementer 305 for incrementing the output of a μ-address register 302, a counter 102 for counting the number of overflows of the incrementer 305, a second selector 103 for dividing and selecting the control code outputted from a μ-ROM 301 responsive to a count value of the counter 102, and with a third selector 104 for selecting the output of the second selector 103 at the time of control code reading mode and for inputting it to the operand address register 309.

4 Claims, 7 Drawing Sheets

FIG. 4

| c2,c1,c0 | b0-b15 | b16-b31 | b32-b47 | b48-b63 | b64-b79 | b80-b95 | b96-b111 | b112-b127 |
|---|---|---|---|---|---|---|---|---|
| 0 0 0 | ○ | × | × | × | × | × | × | × |
| 0 0 1 | × | ○ | × | × | × | × | × | × |
| 0 1 0 | × | × | ○ | × | × | × | × | × |
| 0 1 1 | × | × | × | ○ | × | × | × | × |
| 1 0 0 | × | × | × | × | ○ | × | × | × |
| 1 0 1 | × | × | × | × | × | ○ | × | × |
| 1 1 0 | × | × | × | × | × | × | ○ | × |
| 1 1 1 | × | × | × | × | × | × | × | ○ |

○ : OUTPUTTED TO 3rd SELECTOR
× : CUTOFF

APPARATUS FOR SEQUENTIALLY READING MICROCODE WORDS WIDER THAN AN EXTERNAL BUS WIDTH TO THE OUTSIDE IN SEGMENTS AS WIDE AS THE EXTERNAL BUS

BACKGROUND OF THE INVENTION

1. Field of the Invention

The invention relates to a semiconductor apparatus for data processing being provided with read only memory for holding control codes, more particularly, to a semiconductor apparatus for data processing capable of reading out control codes to its outside.

2. Description of Related Art

In a semiconductor apparatus obtained by configuring data processor on one chip, or in a so called one chip microcomputer, such a method that an actual data processing inside thereof is performed by an aggregate of control codes called a microprogram, is widely adopted.

FIG. 1 is a block diagram showing essential parts of one configuration example of a conventional semiconductor apparatus for data processing provided with a read only memory for holding such control codes.

In FIG. 1, reference numeral 301 designates a read only memory (hereinafter, to be called μ-ROM) for holding control codes, that is, microcodes (hereinafter, to be called μ-code). Some of the U-codes stored in this μ-ROM 301 are combined to compose a microprogram routine.

In addition, the bit length of the μ-code is assumed to be 128 bits in this example.

Numeral 302 designates a μ-address register. The μ-address register 302 holds a position in the μ-ROM 301 of a μ-code to be read next from the μ-ROM 301, that is, an address (hereinafter to be called μ-address) showing a reading position. The μ-address held in this μ-address register 302 is given from a selector 303.

The bit length of the μ-address is assumed to be 12 bits in this example.

The selector 303 selects the μ-address to be read next according to a sequence of the μ-codes. To the selector 303, an address signal line 300 of 12 bits, a μ-stack register 304 of 12 bit width to be described later, and a signal line 310 to which a system reset signal SRS is given, are connected. Accordingly, the selector 303 is also of 12-bit width.

The selector 303 usually selects the address given from the address signal line 300 according to the sequence of the μ-codes, however, in case of returning from the case of branching to subroutine, it selects a value which is stored in the μ-stack register 304. And when the system reset signal SRS given from the signal line 310 becomes an effective value, the selector 303 selects "h'000" (here h' represents hexadecimal number) as a μ-address.

Numeral 305 designates an incrementer. In the case where the sequence of the μ-codes branches to a sub routine, the incrementer 305 increments the μ-address outputted from the μ-address register 302 by "+1" and makes the aforementioned μ-stack register 304 store it. Accordingly, in this case, in the μ-stack register 304, a μ-address next to the μ-address of the μ-code which has generated branch, that is, so-called return μ-address is stored.

The incrementer 305 is also of 12-bit width.

Numeral 306 designates a μ-output register of 128-bit width. The μ-output register 306 holds temporarily the μ-code outputted from the μ-ROM 301.

Numeral 307 designates a μ-decoder. The μ-decoder 307 decodes the μ-code held in the aforementioned μ-output register 306.

Numeral 308 designates a arithmetic units executing various kinds of operations, operand address calculation, and the like by being controlled by codes outputted responsive to the decode result done by the aforementioned μ-decoder 307. Numeral 309 designates an operand address register holding operand address in case of executing operand data accessing to the outside of the semiconductor apparatus.

The bit length of data outputted from the arithmetic units 308 is 16 bits, and accordingly, that of the operand address register 309 is also of 16-bit width.

In addition, in the conventional semiconductor apparatus for data processing shown in FIG. 1, the bit length of the μ-code outputted from the μ-ROM 301 is 128 bits, the bit length of the μ-address inputted to the μ-ROM 301 is 12 bits, the bit-width of the output data of the arithmetic units 308 is 16 bit and the operated address register 309 is of 16 bits, however, these bit numbers are merely an example. The point to be noted here is that, the bit length of an instruction code used in a usual microcomputer is generally 8 or 16 bits, while the bit, length of the μ-code outputted from the μ-ROM 301 is very large, for example, 128 bits as shown in the conventional example of FIG. 1.

Next, explanation will be given on an operation of the conventional semiconductor apparatus for data processing of such a configuration as aforementioned.

The selector 303 selects the μ-address of the μ-code to be read next from the μ-ROM 301 responsive to a state of data processing at that time and outputs it to the μ-address register 302. Usually, the selector 303 selects the μ-address given from the address signal line according to the sequence of the μ-codes and outputs it.

The μ-address outputted from the selector 303 is stored in the μ-address register 302. The μ-address stored in the μ-address register 302 is inputted to the μ-ROM 301, and the μ-code specified by that μ-address is outputted from the μ-ROM 301. The μ-code outputted from the μ-ROM 301 is stored in the μ-output register 306, and further given to the μ-decoder 307 so as to be decoded. By the code outputted from the μ-decoder 307 responsive to the decode result done by the μ-decoder 307, the arithmetic units 308 is controlled.

By the way, in the μ-addresses to be selected by the selector as a U-code to be read next from the μ-ROM 301, there is a return μ-address, at the time of returning from the state of branching to a sub routine to the prior routine. In this case, the μ-address stored in the μ-stack register 304 is selected. The μ-stack register 304 stores a value obtained by incrementing the μ-address outputted at that time point by the μ-address register 302 at the time of branching to the sub routine by "+1" by the incrementer 305. Accordingly, in the μ-stack register 304, since a μ-address corresponding to the μ-code next to the μ-code which has generated branch, that is, a return μ-address is stored, the processing can be returned to the routine before branching by that the selector 303 selects the above fact.

When the system reset signal SRS becomes an ineffective value, the selector 303 selects a μ-address "h'000" corresponding to the μ-code for executing a system reset sequence.

Further, during the semiconductor apparatus for data processing is operating, there is a case that operand data accessing is performed to the outside. In this case, an operand address necessary for operand data accessing is calculated by the arithmetic units 308 and is stored in the operand address register 309. The operand address stored in the operand address register 309 is outputted to the outside of the semiconductor apparatus for data processing through a route (not shown), and by, for example, accessing an external memory or the like, operand data accessing is performed.

The conventional semiconductor apparatus for data processing being provided with the μ-ROM 301 (read only memory) for holding μ-codes (control codes) is so configured as the above, and generally is not provided with a route for reading the μ-code outputted from the μ-ROM 301 to the outside of the semiconductor apparatus directly. Therefore, there has been a problem that it is very difficult to evaluate and analyze, for example, whether the semiconductor elements configuring the μ-ROM 301 have been normally formed in manufacturing a semiconductor apparatus for data processing.

In order to perform such evaluation and analysis, it is necessary to configure so that the μ-code outputted from the μ-ROM 301 can be read directly to the outside of the semiconductor apparatus by providing pads in the periphery of the semiconductor apparatus and further providing output routes (wiring) separately from the μ-ROM 301 to the pads. But generally since the bit length of the μ-code outputted from the μ-ROM is long, there has been a problem that a very large area for wiring and pads is necessary for wiring between the μ-ROM 301 and the pad.

SUMMARY OF THE INVENTION

The present invention has been devised in order to solve such problems, and the object thereof is to provide a semiconductor apparatus for data processing capable of reading out control code to the outside and of executing evaluation and analysis of the read only memory of control codes, that is, the μ-ROM easily by making the wiring area for reading out the control code to the outside as small as possible.

A semiconductor apparatus for data processing of the invention, comprising: a read only memory (301) which stores a plurality of control codes executing internal controls; an address register (302) which holds an address specifying a control code to be read next from the read only memory (301); an incrementer (305) which increments and outputs an output of the address register (302) and for generates an overflow signal (OF) in case of overflowing; a register (304) which usually takes in a value outputted from the incrementer (305) when a predetermined signal is an effective value and continues the output state having been maintained when the predetermined signal is an ineffective value; a first selector (303) which outputs a value held by the register (304) as an address to be held by the address register (302) when the predetermined signal is an effective value and selects an address to be held by the address register (302) according to a predetermined sequence and outputs it when the predetermined signal is an ineffective value; arithmetic units (308) which executes data processing according to a control code read from the read only memory (301); a counter (102) which counts, when the incrementer (305) generates the overflow signals (OF), the numbers of the overflows; a second selector (103) which makes the control code outputted from the read only memory (301) as an input data, makes each part of plural-divided input data as an output data, and selects and outputs any part of the input data predetermined responsive to a count value of the counter (102) as an output data; a third select, or (104) which selects the output of the second selector (103) when the predetermined signal shows an effective value, and the data of the operation result done by the arithmetic units (308) when the predetermined signal is an ineffective value respectively to output it, and an outputting means (309) for outputting the output of the third selector (104) to the outside.

The semiconductor apparatus of the present invention is provided with switching means for, at the usual data processing mode, cutting off a route which inputs the control code outputted from the read only memory.

Further, the semiconductor apparatus of the invention is so configured that the control code outputted from the read only memory is not inputted to the second selector at the time of usual data processing mode.

In the semiconductor apparatus for data processing of the invention, when a control code reading mode is set by a mode signal, control codes are outputted successively from the read only memory in the order of addresses by that the contents of the address register are successively incremented by the incrementer, and the number of overflows of the incrementer is counted by the counter. Then a part of the control code outputted from the read only memory is selected at the second selector responsive to a count value of the counter, and outputted to the outside through output means. Accordingly, all bits of the whole control codes are outputted in such a manner that a part of the same bits of the whole control codes are successively outputted to the outside, and next, a part of the other same bits of the whole control codes are outputted successively to the outside.

In the semiconductor apparatus for data processing of the invention, a control code is inputted to the second selector only under the control code reading mode.

Further, in the semiconductor apparatus for data processing of the invention, the second selector operates only under the control code reading mode.

The above and further objects and features of the invention will more fully be apparent from the following detailed description with accompanying drawings.

BRIEF DESCRIPTION OF THE DRAWINGS

FIG. 4 is a table showing a relation between the input and output signals and control signals of the second selector of the first embodiment of the semiconductor apparatus for data processing of the invention.

DESCRIPTION OF THE PREFERRED EMBODIMENTS

In the following, explanation will be made in detail on the invention referring to drawings showing the embodiments thereof.

First Embodiment

Figure 1:
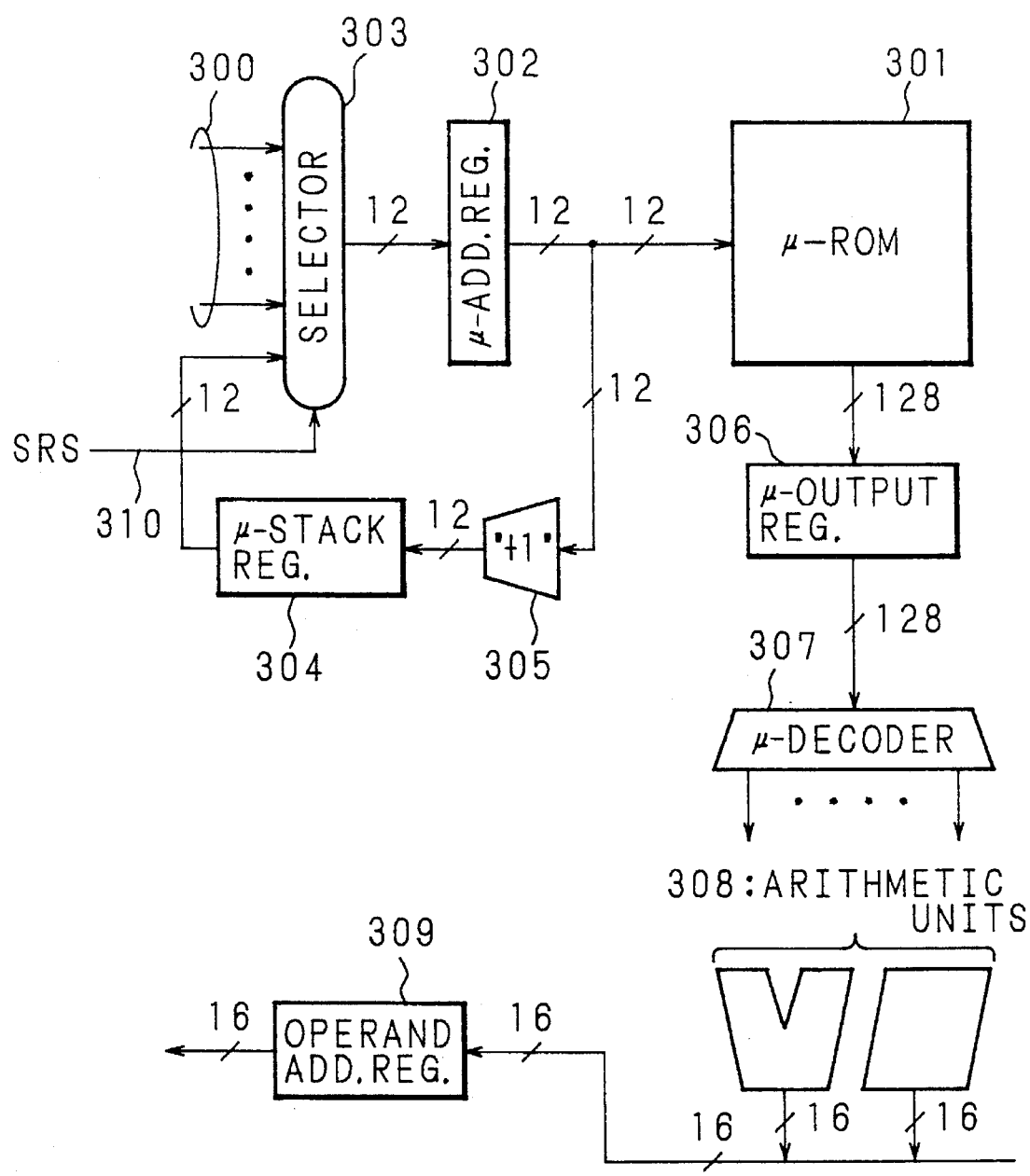
FIG. 1 is a block diagram showing essential parts of a configuration example of a conventional semiconductor apparatus for data processing.
Figure 2:
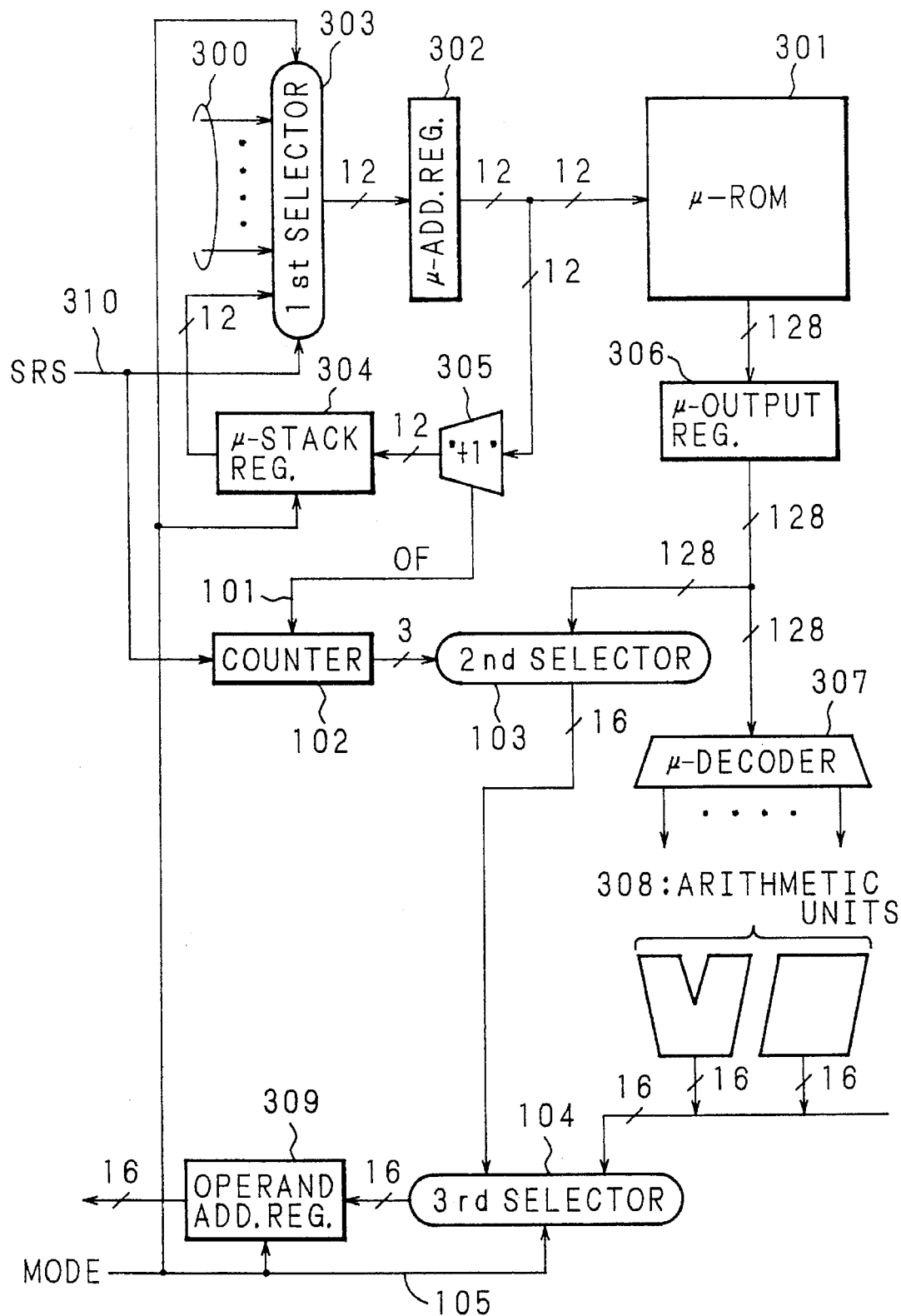
FIG. 2 is a block diagram showing essential parts of a configuration example of a first embodiment of a semiconductor apparatus for data processing of the invention.

FIG. 2 is a block diagram showing essential parts of a configuration of the first embodiment of the semiconductor apparatus for data processing of the invention. In addition, in FIG. 2, the same reference characters as those in FIG. 1 referred to in the explanation of the aforementioned conventional example show the same or the corresponding parts.

In FIG. 2, reference numeral 301 designates a read only memory (hereinafter, to be called μ-ROM) holding control codes, that, is, microcodes (hereinafter, to be called μ-codes). Some of the μ-codes stored in this μ-ROM are combined to compose a microprogram routine.

In addition, the bit length of the μ-code is assumed to be 128 bits in this example.

Reference numeral 302 designates a μ-address register which holds a position in the μ-ROM 301 of the μ-code to be read next from the μ-ROM 301, that is, an address (hereinafter, to be called μ-address) showing a reading position. The μ-address held in the address register 302 is given from a first selector 303.

In addition, the bit length of the μ-address is assumed to be 12 bits in this example.

The first selector 303 selects a μ-address to be read next according to the sequence of the μ-codes. To the first selector 303, an address signal line 300 of 12 bits, a μ-stack register 304 of 12-bit width to be described later, a signal line 310 from which a system reset signal SRS is given, a signal line 105 from which a mode signal MODE is given, are connected. Accordingly, the selector 303 is also of 12-bit width.

The first selector 303 usually selects a μ-address given through the address signal line 300 according to the sequence of the μ-codes, however, at the time of returning from the case of branching to subroutine, selects a value stored in the μ-stack register 304. When the system reset signal SRS is given from the signal line 310, the first selector 303 selects "h'000 (h' represents hexadecimal number)".

Reference numeral 305 designates an incrementer. In the case where the sequence of the μ-codes is branched to a sub routine, it increments the μ-address stored by the μ-address register 302 by "+1" at that time point, and makes the aforementioned U-stack register 304 store the increment result. Accordingly, in this case, in the μ-stack register 304, the U-address corresponding to the μ-code next to the μ-code which has generated branch, that is, the so-called return μ-address is stored.

In addition, the incrementer 305 is also of 12-bit width.

In case of overflow of the incrementer 305, specifically, in the case where the count value thereof becomes "h'000" from "h'FFF", it outputs an overflow signal OF. This overflow signal OF is given to the counter 102 through the signal line 101.

The counter 102 counts the overflow signal OF given through the aforementioned signal line 101. In other words, the counter 102 counts the number of overflows of the incrementer 305. The counter 102 is of 3-bit configuration, and counts from "b'000" (b' represents binary number) to "b'111", that is, from "0" to "7" in decimal number, and gives the count value to a second selector 103 to be described later.

In addition, to the counter 102, the system reset signal SRS is given through the signal line 310. When the system reset signal SRS becomes an effective value, its count value is reset to be "b'000".

Reference numeral 306 designates a μ-output register of 128-bit width. The μ-output register 306 holds temporarily the μ-code outputted from the μ-ROM 301.

Reference numeral 307 designates a μ-decoder which decodes the μ-code held in the aforementioned μ-output register 306.

Numeral 308 designates a arithmetic units which is controlled by the codes outputted responsive to the decode result done by the aforementioned μ-decoder 307 to execute various kinds of operations, operand address calculation, and the like. The output data of the arithmetic unit 308 is given to the operand address register 309 through the third selector 104 to be described later.

The operand address register 309 holds an operand address calculated by the aforementioned arithmetic units 308 at the time of performing operand data accessing to the outside of the semiconductor apparatus of the invention. A third selector is provided between the operand address register 309 and the arithmetic units 308.

To the operand address register 309, a mode signal MODE is given through the signal line 105.

In addition, the bit length of data outputted from the arithmetic units 308 is 16 bits. Accordingly, the operand address register 309 is also of 16-bit width.

Reference numeral 103 designates the second selector as aforementioned. The second selector 103 selects a predetermined bit-width (16-bit width) of a part of 128-bit μ-code outputted from the μ-output register 306 responsive to a count value of 3 bits of the counter 102 so as to output selected data to the third selector 104.

Numeral 104 designates the third selector as aforementioned. The third selector 104 inputs the output of 16 bits of the second selector 103 and other output of 16 bits of the arithmetic unit is 308, selects either of them responsive to the mode signal MODE given through the signal line 105 so as to output it to the operand address register 309.

The mode signal MODE is inputted to the semiconductor apparatus for data processing of the invention from the outside through the signal line 105, and is given to the first selector 303, μ-stack register 304, operand address register 309 and the third selector 104.

The mode signal MODE sets usual data processing mode in case of ineffective value and mode for reading μ-codes to the outside, that is, control code reading mode (hereinafter, to be called μ-reading mode) in case of effective value, respectively to the semiconductor apparatus for data processing of the invention. Specifically, in the case where the mode signal MODE is an effective value by which μ-reading mode is set, the first selector 303 always selects the output of the μ-stack register 304, the μ-stack register 304 always takes in the output of the incrementer 305 to output, it, the third selector 104 always takes in the output of the second selector 103 to output it, and the operand address register 309 always takes in the output of the third selector 104 to output it.

In the semiconductor apparatus for data processing of the invention shown in FIG. 2, the bit length of the μ-code outputted from the μ-ROM 301 is 128 bits, the bit length of the μ-address inputted to the μ-ROM 301 is 12 bits, the bit length of the output data of the arithmetic units 308 is 16 bits, and the operand address register 309 is 16 of bits, however, these bit numbers are merely an example.

In addition, the counter 102 is a 3-bit counter as aforementioned, and counts from "0" to "7" in decimal number.

Next, explanation will be made on the operation of the semiconductor apparatus for data processing of the invention as aforementioned. To meet the convenience of the explanation, the μ-address for the μ-code for executing the system reset sequence is assumed to be "h'000". Further, when the mode signal MODE is an ineffective value, the semiconductor apparatus for data processing of the invention is in usual data processing mode. In this case, it is assumed that the first selector 303 and the μ-stack register 304 operate in the same way as in the conventional example shown in FIG. 1 and the third selector 104 always selects the output from the arithmetic units 308.

When the mode signal MODE is an effective value, the semiconductor apparatus for data processing of the invention becomes in the μ-reading mode. In this case, the first selector 303 always selects the output of the μ-stack register 304 to give it to the μ-address register 302, and the μ-stack register 304 always takes in the output of the incrementer 305 to store it. Accordingly, the first selector 303, the μ-address register 302, the incrementer 305, and the μ-stack register 304 are connected in a loop state to form a counter circuit.

But when the system reset signal SRS becomes an effective value, the first selector 303 selects the μ-address "h'000" corresponding to the μ-code for executing the system reset sequence. Thereby, since the value of the μ-address register 302 is initialized to be "h'000", the μ-code for executing the system reset sequence is outputted from the μ-ROM 301 and the semiconductor apparatus for data processing of the invention is reset.

When the incrementer 305 increments a μ-address outputted from the μ-address register 302, in the case where the μ-address is "h'FFF", the incrementer 305 overflows to make the overflow signal OF become an effective value and the content of the μ-stack register 304 returns to "h'000". When the system reset signal SRS becomes an effective value, the counter 102 is initialized to make its count value become "b'000", and when the system reset signal SRS keeps an ineffective value, it counts the number of effective values of the overflow signal OF.

The second selector 103 selects one of the parts of the μ-code of 128 bits from bit 0 to bit 127 outputted by the μ-output register 306, each part being 16 bits, and outputs it to the third selector 104.

Figure 3:
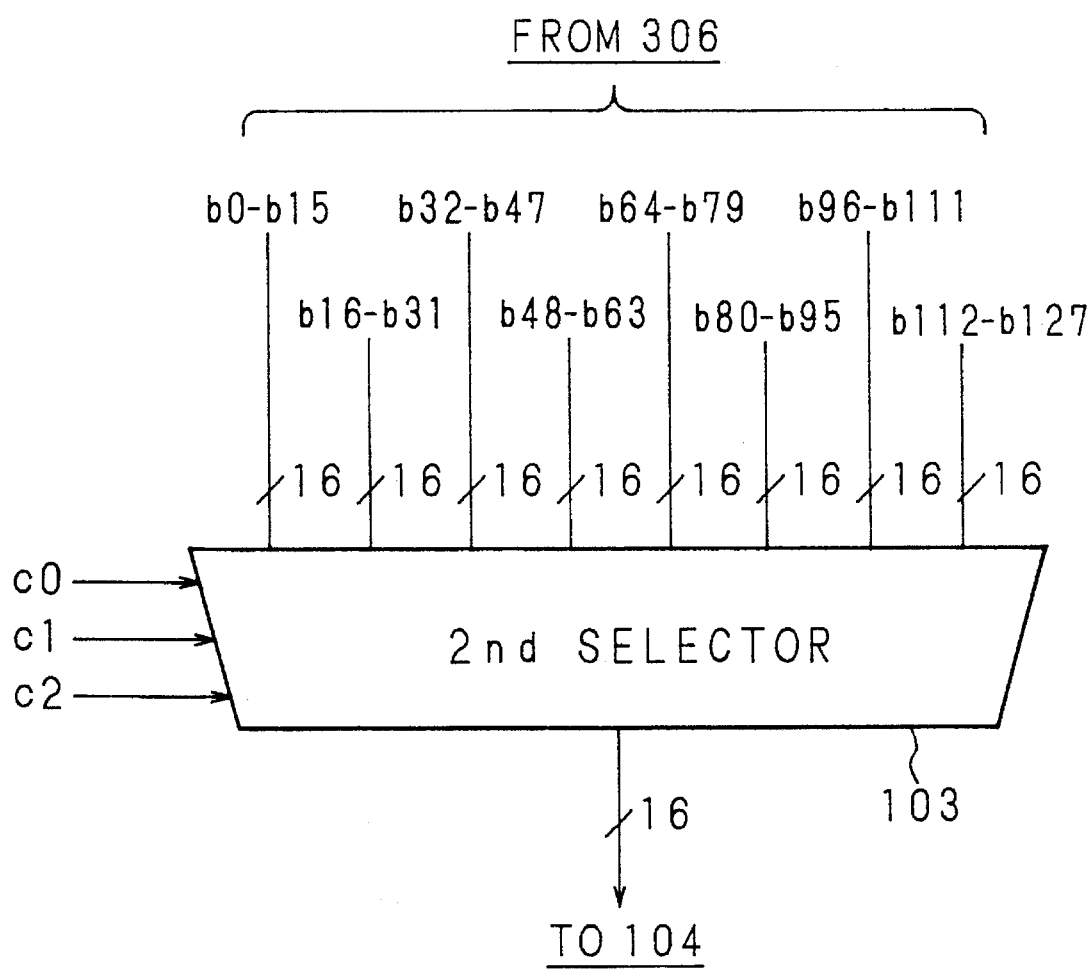
FIG. 3 is a schematic diagram showing input and output signals and control signals of the second selector of the first embodiment of the semiconductor apparatus for data processing of the invention.

The configuration of the second selector 103 is shown schematically in the schematic diagram of FIG. 3.

To the second selector 103, the μ-code of 128 bits which is the output of the μ-output register 306 is inputted by being divided into 16 bits each, specifically, bit 0 (b0) to bit 15 (b15), bit 16 (b16) to bit 31 (b31), bit 32 (b32) to bit 47 (b47), bit 48 (b48) to bit 63 (b63), bit 64 (b64) to bit 79 (b79), bit 80 (b80) to bit 95 (b95), bit 96 (b96) to bit 111 (b111), and bit 112 (b112) to bit 127 (b127). And the count values of 3 bits (c1, c2, c3) of the counter 102 are inputted as a control signal.

FIG. 4 is a table showing a relation between count values as a control signal given from the counter 102 to this second selector 103, and inputs and outputs.

Specifically, the second selector 103 selects 16 bits from bit 0 (b0) to bit 15 (b15) of a μ-code outputted from the μ-output register 306 when the value of the counter 102 is "b'000", selects 16 bits from bit 16 (b16) to bit 31 (b31) of the μ-code when "b'001", selects 16 bits from bit 32 (b32) to bit 47 (b47) of the μ-code when "b'010", selects 16 bits from bit 48 (b48) to bit 63 (b63) when "b'011", selects 16 bits from bit 64 (b64) to bit 79 (b79) of the μ-code when "b'100", selects 16 bits from bit 80 (b80) to bit 95 (b95) of the μ-code when "b'101", selects 16 bits from bit 96 (b96) to bit 111 (b111) of the μ-code when "b'110", and selects 16 bits from bit 112 (b112) to bit 127 (b127) of the μ-code when "b'111", to output them respectively.

When the mode signal MODE is an effective value, the third selector 104 always selects and outputs the output of the second selector 103, the operand address register 309 always stores the output of the third selector 104, and the output of the operand address register 309 is always outputted to the outside of the semiconductor apparatus through a route not shown.

Accordingly, in order to output the μ-code to the outside from the semiconductor apparatus for data processing of the invention, such a procedure as mentioned below is performed.

The semiconductor apparatus for data processing of the invention becomes in the μ-reading mode during the mode signal MODE is an effective value. During this state, when the system reset signal SRS becomes an effective value at first, the semiconductor apparatus for data processing of the invention is initialized. After this, when the system reset signal SRS becomes an ineffective value, the μ-address "h'000" is outputted from the μ-address register 302 at first to be given to the μ-ROM 301 and the incrementer 305. Thereby, the μ-code of the μ-address "h'000" is outputted from the μ-ROM 301 to be inputted to the second selector 103 through the μ-output register 306.

On the other hand, the incrementer 305 increments the μ-address "h'000" outputted from the μ-address register 302 by "+1" and outputs the next μ-address "h'001". The μ-address "h'001" outputted from the incrementer 305 is selected by the first selector 303 and is given to the μ-address register 302. Accordingly, from the μ-address register 302, the μ-address "h'001" is outputted to be given to the μ-ROM 301 and the incrementer 305. Thereby, from the μ-ROM 301, the μ-code of the μ-address "h'001" is outputted to be inputted to the second selector 103 through the μ-output register 306.

In the following, while μ-addresses are incremented by "1" by "1", the same operations are repeated, and the μ-addresses from the "h'000" to "h'FFF" are successively outputted from the μ-address register 302 to be given to the μ-ROM 301. Thereby, from the μ-ROM 301, the μ-codes of the respective μ-addresses from "h'000" to "h'FFF" are successively outputted to be inputted to the second selector 103 through the μ-output register 306.

On the other hand, while the μ-codes of the respective μ-addresses from "h'000" to "h'FFE" one before the "h'FFF" are successively outputted from the μ-ROM 301, since the incrementer 305 does not overflow, the count value of the counter 102 keeps "b'000", and the second selector 103 selects 16 bits from bit 0 to bit 15 among the input of 128 bits during that time. The 16 bits selected by the second selector 103 are outputted to the outside of the semiconductor apparatus for data processing of the invention from the third selector 104 through the operand address register 309.

Accordingly, the 16 bits from bit 0 to bit 15 among the μ-codes of the respective addresses from the μ-address "h'000" to "h'FFF" outputted from the μ-ROM 301 are selected by the second selector 103 to be outputted to the outside of semiconductor apparatus through the third selector 104 and the operand address register 309.

By the way, in the aforementioned operations, at the time when the μ-address "h'FFF" is outputted from the μ-address register 302, since the incrementer 305 overflows, the overflow signal OF becomes an effective value. In this case, since the incrementer 305 outputs the μ-address "h'000", the μ-address "h'000" is given from the μ-address register 302 to the μ-ROM 301 next. On the other hand, the counter 102 counts that the overflow signal OF becomes an effective value, and the count value becomes "b'001" from "b'000".

When the count value of the counter 102 becomes "b'001" in this way, the second selector 103 is in the state in which it selects 16 bits from bit 16 to bit 31 of the input of 128 bits are selected.

After this, at first, the μ-address "h'000" is outputted from the μ-address register 302 and given to the μ-ROM 301 and the incrementer 305, and the operations until the address register 302 outputs the μ-μ-address "h'FFF" are repeated in the same way as aforementioned. In this case, since the second selector 103 selects 16 bits from bit 16 to bit 31 of the input of 128 bits, 16 bits from bit 16 to bit 31 of the μ-codes of the respective addresses from the μ-address "h'000" to "h'FFF" outputted from the μ-ROM 301 are selected by the second selector 103 and are outputted to the outside of the semiconductor apparatus through the third selector 104 and the operand address register 309.

In the following, in the same way as aforementioned, each 16 bits are read out to the outside of the semiconductor apparatus for data processing of the invention in such a manner that 16 bits from bit 32 to bit 47 of the respective μ-codes from the μ-address "h'000" to "h'FFF" are read out successively, 16 bits from bit 48 to bit 63 of the respective μ-codes from the μ-address "h'000" to "h'FFF" are read out successively, 16 bits from bit 64 to bit 79 of the respective μ-codes from the μ-address "h'000" to "h'FFF" are read successively, 16 bits from bit 80 to bit 95 of the respective μ-codes from the μ-address "h'000" to "h'FFF" are read successively, 16 bits from bit 96 to bit 111 of the respective μ-codes from the μ-address "h'000" to "h'FFF" are read successively, and 16 bits from bit 112 to bit 127 of the respective μ-codes from the μ-address "h'000" to "h'FFF" are read successively.

According to the first embodiments of the semiconductor apparatus for data processing of the invention as aforementioned, as apparent from the comparison of FIG. 1 with FIG. 2, μ-codes can be read out from the μ-ROM 301 directly to the outside by adding relatively a small quantity of logical circuit. Thereby, evaluation and analysis of the μ-ROM can be performed easily. And since the configuration design so that a μ-code having large bit length is divided into 16-bit units usually dealt with in a microcomputer so as to be read to the outside, it is effective that a small area is enough for a wiring area for reading out the μ-codes.

Second Embodiment

Figure 5:
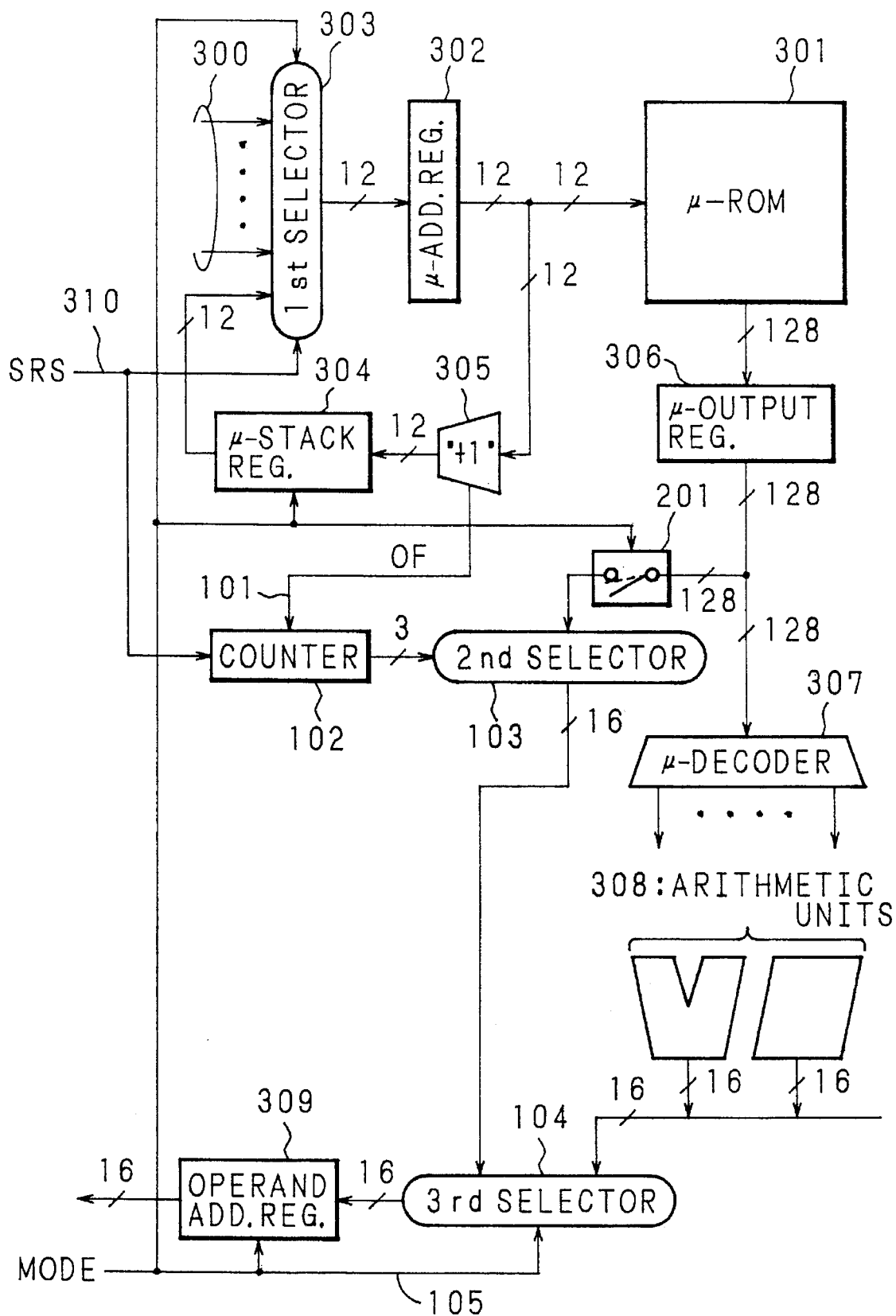
FIG. 5 is a block diagram showing essential parts of a configuration example of a second embodiments of the semiconductor apparatus for data processing of the invention.

FIG. 5 is a block diagram showing a second embodiment of the semiconductor apparatus for data processing of the invention.

In FIG. 5, reference numerals 301 to 310 designate the same or the corresponding parts as those shown in FIG. 1 and FIG. 2. Reference numerals 101 to 105 designate the same or corresponding parts as those shown in FIG. 2.

Reference numeral 201 designates a switching element. This switching element 201 is interposed on a route transferring the μ-code from the μ-output register 306 to the second selector 103. The switching element 201 connects the μ-output register 306 and the second selector 103 so as to input the μ-code outputted from the μ-output register 306 to the second selector 103 when the mode signal MODE is an effective value, and cuts off between the μ-output register 306 and the second selector 103 so as not to input the μ-code outputted from the μ-output register 306 to the second selector 103 when the mode signal MODE is an ineffective value.

In the second embodiments of the semiconductor apparatus for data processing of the invention being provided with such a switching element 201, when the mode signal MODE is an ineffective value (in the usual data processing mode), the switching element 201 is in the state shown by a broken line in FIG. 5, leading to make the μ-code outputted from the μ-output register 306 cut off so as not to be inputted to the second selector 103. On the other hand, when the mode signal MODE is an effective value (in the μ-reading mode), the switching element 201 is in the state shown by a solid line in FIG. 5. This enables the route of the control code inputted to the second selector 108 from the μ-output register 306 to be connected.

According to the second embodiment, at the time of usual data processing mode, since the second selector 103 does not have to be operated, excessive electric power consumption is restricted and transmission speed of the control code to the μ-decoder 307 is not damaged.

In the aforementioned first embodiment, when the system reset signal SRS becomes an effective value, the contents of the μ-address register 302 and the counter 102 becomes "b'000", however, the present invention does not limit these values. The invention also does not limit a method how to divide and select the μ-code done by the second selector 103. In the first embodiment, the μ-code is outputted to the outside of the semiconductor apparatus from the operand address register 309, however, means for outputting the μ-code is not limited in the invention.

In the aforementioned embodiment, the switching element 201 is connected to the route of the control code inputted from the μ-output register 306 to the second selector 103, however, the same effect is obtained when the second selector 103 cuts off the route from the μ-register 306 to the third selector 104 instead of connecting the switching element 201 when the mode signal MODE is an ineffective value.

Second Embodiment

Figure 6:
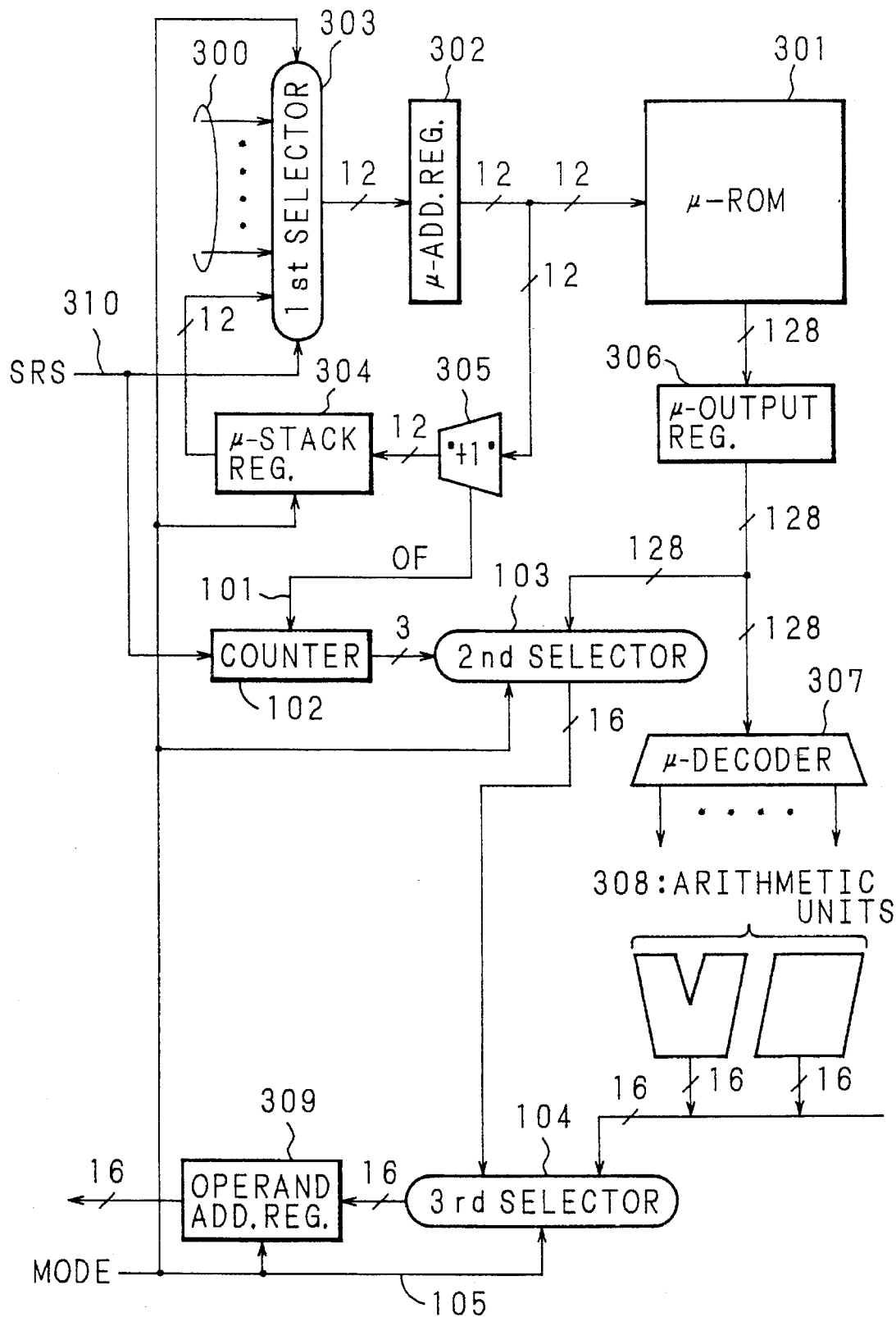
FIG. 6 is a block diagram showing essential parts of a configuration example of a third embodiment of the semiconductor apparatus for data processing of the invention.
Figure 7:
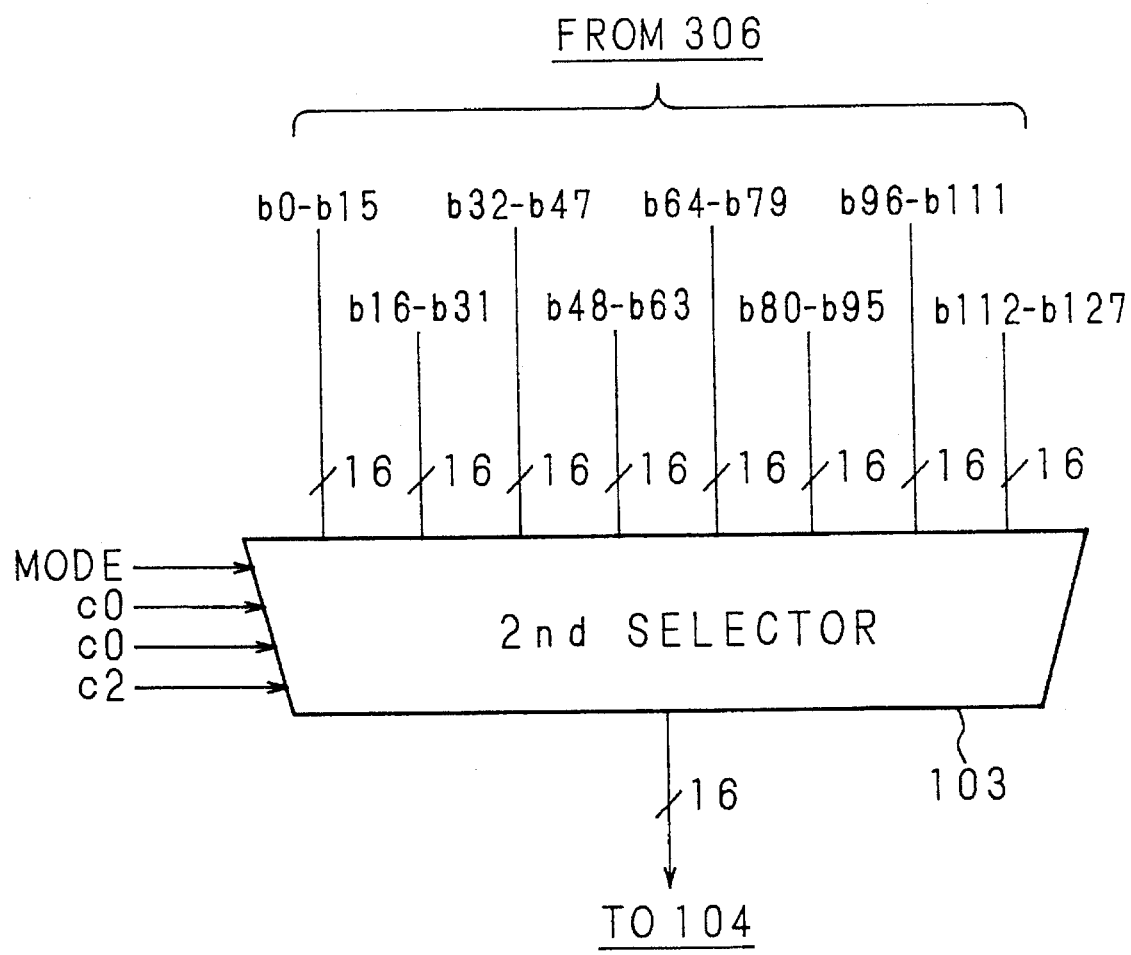
FIG. 7 is a schematic diagram showing input and output signals and control signals of the second selector of the third embodiment of the semiconductor apparatus for data processing of the invention.

The configuration of the essential parts of the third embodiment of the semiconductor apparatus for data processing of the invention as aforementioned is shown in the block diagram of FIG. 6 and a configuration example of the second selector 103 is shown in the schematic diagram of FIG. 7.

The difference of the configuration of the third embodiment shown in FIG. 6 and FIG. 7 from that of the first embodiment, is that also the mode signal MODE is inputted to the second selector 103 as a control signal besides the 3-bit count values, c0, c1, c2 of the counter 102.

The relation of the input and output signals of the second selector 103 shown in FIG. 7 is totally same as that shown in a table of FIG. 4 when the mode signal MODE is an effective value, however, when the mode signal is an ineffective value, all input signals are cut off regardless of the 3-bit count values c0, c1, c2 of the counter 102.

As aforementioned, according to the present invention, by adding relatively a small quantity of logical circuit and wiring area, the control codes can be read directly out to the outside of the semiconductor apparatus. This enables the evaluation and analysis easily.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within the metes and bounds of the claims, or equivalence of such metes and bounds thereof are therefore intended to be embraced by the claims.

What is claimed is:

1. A semiconductor apparatus for data processing, comprising:

a read only memory (301) which stores a plurality of control codes executing internal controls;

an address register (302) which holds an address specifying a control code to be read next from said read only memory (301);

an incrementer (305) which increments and outputs the output of said address register (302) and which generates an overflow signal (OF) in case of overflowing;

a register (304) which always takes in and outputs values outputted from said incrementer (305) when a predetermined signal is an effective value, and which continues the output state having been maintained when said predetermined signals is an ineffective value;

a first selector (303) which outputs a value held by said register (304) as an address to be held by said address register (302) when said predetermined signal is an effective value, and which selects and outputs an address to be held by said address register (302) according to a predetermined sequence when said predetermined signal is an ineffective value;

arithmetic units (308) which executes data processing according to a control code read out from said read only memory (301);

a counter (102) which counts the number of the cases where said incrementer (305) generates the overflow signal (OF);

a second selector (103), in which a control code outputted from said read only memory (301) is an input data and each part obtained by dividing the input data into plural is an output data, which selects and outputs any part of the input data predetermined responsive to a count value of said counter (102);

a third selector (104) which selects and outputs respectively the output of said second selector (103) when said predetermined signal is an effective value, and the data of the operation result done by said arithmetic units (308) when said predetermined signal is an ineffective value; and outputting means (309) for outputting the output of said third selector (104) to the outside.

2. A semiconductor apparatus for data processing as set forth in claim 1, further comprising:

switching means (201), which is connected to the input of said second selector (103), and which cuts off the input of a control code to said second selector (103) by being turned off when said predetermined signal is an ineffective value.

3. A semiconductor apparatus for data processing as set forth in claim 2, wherein said predetermined signal is given to said second selector (103), and said second selector (103) does not perform selecting operation when said predetermined signal is an ineffective value.

4. A semiconductor apparatus for data processing as set forth in claim 2, wherein the control code read from said read only memory (301) is of 128 bits, the data outputted from said output means (309) is of 16 bits, said counter (102) is a 3-bit counter, and said second selector (103) divides the 128 bits of said control code into 16 bits each responsive to the count values of 3 bits of said counter (102) and output them.

* * * * *